(12) United States Patent
Sawahata et al.

(10) Patent No.: US 10,589,612 B2
(45) Date of Patent: Mar. 17, 2020

(54) ATTACHMENT STRUCTURE FOR VEHICLE EXTERIOR PANEL

(71) Applicant: WEBASTO JAPAN CO., LTD., Higashihiroshima-shi, Hiroshima (JP)

(72) Inventors: Koji Sawahata, Higashihiroshima (JP); Akio Yamada, Higashihiroshima (JP); Syuji Yoshida, Higashihiroshima (JP); Masato Shinkawa, Hiroshima (JP); Takuya Nishibayashi, Hiroshima (JP)

(73) Assignee: WEBASTO JAPAN CO., LTD., Hiroshima (JP)

( * ) Notice: Subject to any disclaimer, the term of this patent is extended or adjusted under 35 U.S.C. 154(b) by 38 days.

(21) Appl. No.: 16/084,889

(22) PCT Filed: Feb. 27, 2017

(86) PCT No.: PCT/JP2017/007495
§ 371 (c)(1),
(2) Date: Sep. 13, 2018

(87) PCT Pub. No.: WO2017/159320
PCT Pub. Date: Sep. 21, 2017

(65) Prior Publication Data
US 2019/0077240 A1  Mar. 14, 2019

(30) Foreign Application Priority Data
Mar. 18, 2016 (JP) .................... 2016-055665

(51) Int. Cl.
*B60J 7/12* (2006.01)
*B60J 10/90* (2016.01)
*B60J 10/36* (2016.01)
*B60J 7/14* (2006.01)

(52) U.S. Cl.
CPC ............. *B60J 10/90* (2016.02); *B60J 7/12* (2013.01); *B60J 7/145* (2013.01); *B60J 10/36* (2016.02)

(58) Field of Classification Search
CPC ...................................... B60R 13/04
USPC ...................................... 296/107.04
See application file for complete search history.

(56) References Cited

U.S. PATENT DOCUMENTS

| 9,114,765 B1 * | 8/2015 | James ............... B60R 13/04 |
| 2013/0127196 A1 * | 5/2013 | Takeuchi ............ B60R 13/04 |
| | | 296/1.08 |

FOREIGN PATENT DOCUMENTS

| EP | 1 872 993 A2 | 1/2008 |
| JP | 51-130515 | 10/1976 |
| JP | 2003-231418 A | 8/2003 |
| JP | 2007-331679 A | 12/2007 |
| JP | 2011-126388 A | 6/2011 |

* cited by examiner

*Primary Examiner* — Pinel E Romain
(74) *Attorney, Agent, or Firm* — Maschoff Brennan (57) ABSTRACT

A weather strip 5 is attached to a peripheral edge of an opening 4a of a vehicle body 1', and a deck cover 18 includes a resin outer panel 21 and an inner panel 23 joined onto a rear side of the outer panel 21. A spacer 35 is interposed between the outer panel 21 and the inner panel 23 such that a portion of the deck cover 18 provided with the spacer 35 makes contact with the weather strip 5 when the deck cover 18 is closed.

3 Claims, 11 Drawing Sheets

ATTACHMENT STRUCTURE FOR VEHICLE EXTERIOR PANEL

TECHNICAL FIELD

The present invention is useful as a structure for attaching a vehicle external panel to a vehicle body in such a manner that the vehicle external panel can cover and uncover an opening of the vehicle body.

BACKGROUND ART

Patent Document 1 discloses, as a vehicle external panel which is attached to a vehicle body in such a manner that the panel can cover and uncover an opening of the vehicle body, a deck cover which can cover and uncover an opening of a storage formed in a rear portion of the vehicle.

CITATION LIST

Patent Document

[Patent Document 1] Japanese Unexamined Patent Publication No. 2007-331679

SUMMARY OF THE INVENTION

Technical Problem

According to a structure for attaching a vehicle external panel to the vehicle body, as disclosed by Patent Document 1, an inner panel is placed on a rear side of an outer panel made of resin with their outer peripheral edges directly joined together to form an external panel. When the external panel is closed, a peripheral edge of the external panel makes contact with a weather strip attached to a peripheral edge of an opening of the vehicle body.

In this structure, however, the outer and inner panels are directly joined together at a portion of the external panel to be in contact with the weather strip for the purposes of saving space and giving watertightness to the external panel itself, and the contact between the external panel and the weather strip. Therefore, the outer panel needs to be substantially parallel to the inner panel at the contact between the external panel and the weather strip. This lowers the design flexibility.

In view of the foregoing, the present invention has been achieved to improve design flexibility of a vehicle external panel.

Solution to the Problem

A first aspect of the present invention is directed to a structure for attaching, to a vehicle body of a vehicle, an external panel which is able to cover and uncover an opening of the vehicle body, wherein a weather strip is attached to a peripheral edge of the opening of the vehicle body, the external panel includes an outer panel made of resin, and an inner panel joined onto a rear side of the outer panel, a spacer is interposed between the outer panel and the inner panel, and a portion of the external panel provided with the spacer makes contact with the weather strip when the external panel is closed.

In this configuration, the spacer is interposed between the outer and inner panels at the contact between the external panel and the weather strip. Thus, the outer panel can be inclined steeply with respect to the inner panel at the contact between the external panel and the weather strip. This can improve design flexibility.

Further, the contact between the external panel and the weather strip is reinforced by the spacer. This can provide the external panel with improved rigidity.

A second aspect of the invention is an embodiment of the first aspect. In the second aspect, a positioning hole is formed through the inner panel, the spacer is bonded to the inner panel with an adhesive, and the spacer has a positioning protrusion fitting in the positioning hole of the inner panel.

In this configuration, in a bonding process, the positioning protrusion of the spacer fits in the positioning hole of the inner panel. Thus, the spacer can be positioned with respect to the inner panel in a direction along a face of the inner panel. This facilitates the bonding process.

A third aspect of the invention is an embodiment of the first or second aspect. In the third aspect, a first rivet insertion hole is formed through the inner panel, the spacer is bonded to the inner panel with an adhesive, and a second rivet insertion hole is formed through the spacer, and a rivet is inserted and swaged in the second rivet insertion hole and the first rivet insertion hole of the inner panel.

In this configuration, in the bonding process, the adhesive can be cured in a state where the rivet is inserted and swaged in the first rivet insertion hole of the inner panel and the second rivet insertion hole of the spacer to position the spacer with respect to the inner panel in the thickness direction. This can reduce the possibility of bonding failure caused by lifting of the spacer or lack of an adhesive between the spacer and the inner panel.

Advantages of the Invention

The present invention can improve design flexibility of a vehicle external panel.

DETAILED DESCRIPTION

Embodiments of the present invention will be described in detail below with reference to the drawings. Note that the following description of embodiments is merely examples in nature, and is not intended to limit the scope, application, or uses of the present invention.

Figure 1:
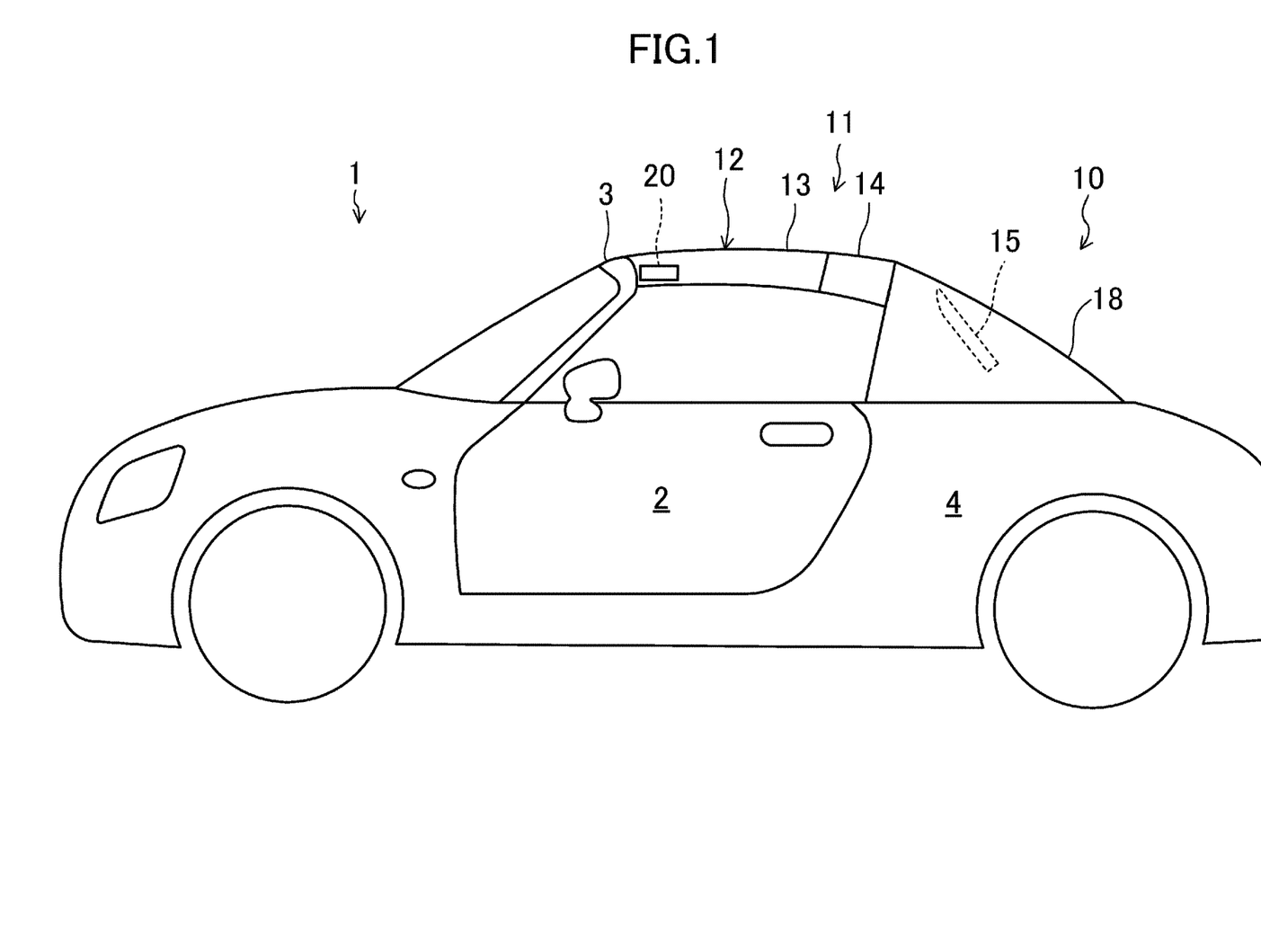
FIG. 1 is a schematic side view illustrating a general configuration of a vehicle to which a structure for attaching an external panel of an embodiment is applied, with a cabin being closed.
Figure 2:
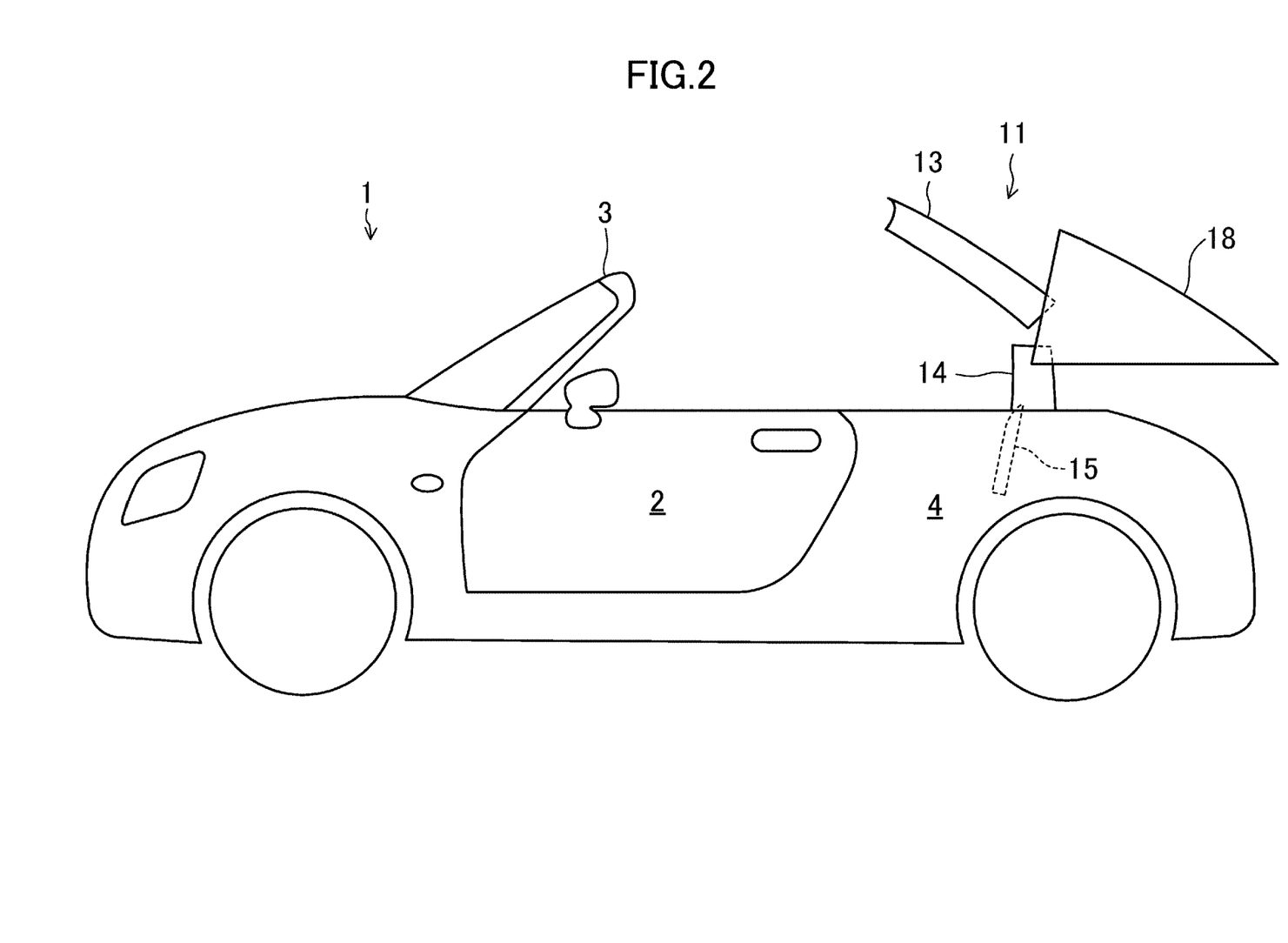
FIG. 2 is a schematic side view illustrating the general configuration of the vehicle to which the structure for attaching the external panel of the embodiment is applied, with a retractable roof being located between a use position and a retracted position, and a deck cover being at a retreated position.
Figure 3:
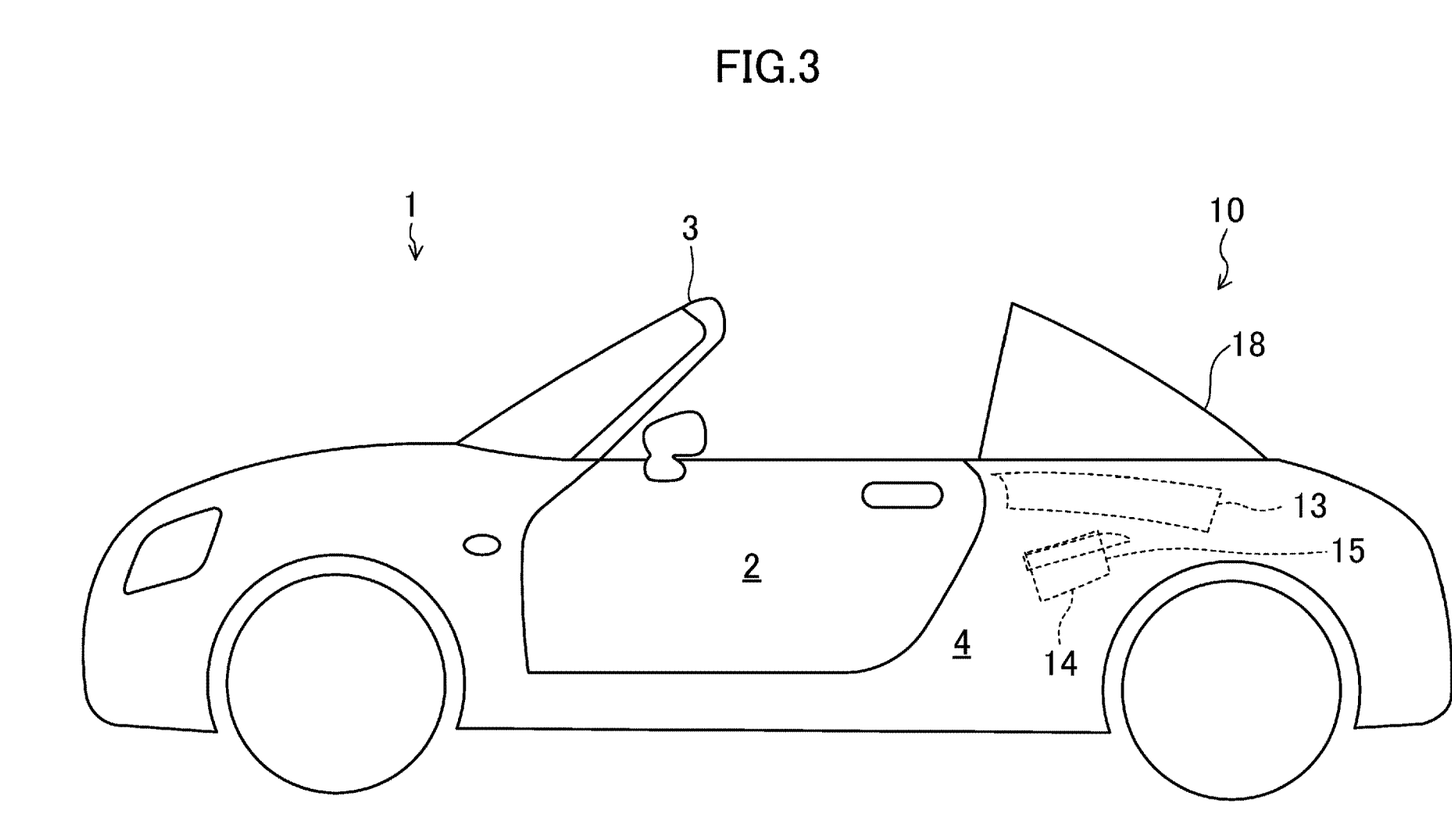
FIG. 3 is a schematic side view illustrating the general configuration of the vehicle to which the structure for attaching the external panel of the embodiment is applied, with a cabin being open.
Figure 8:
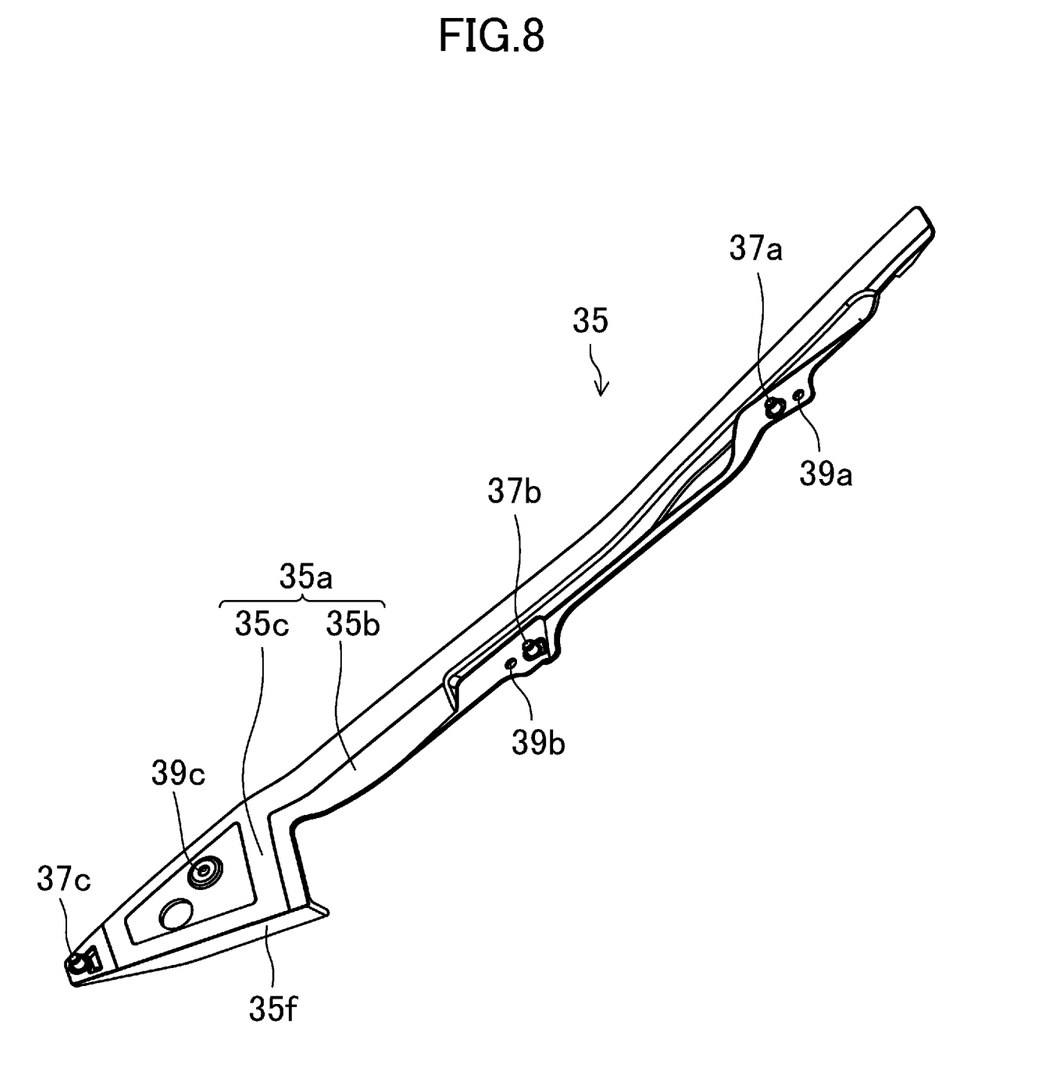
FIG. 8 is a perspective view of the spacer as viewed from the inner panel side.
Figure 9:
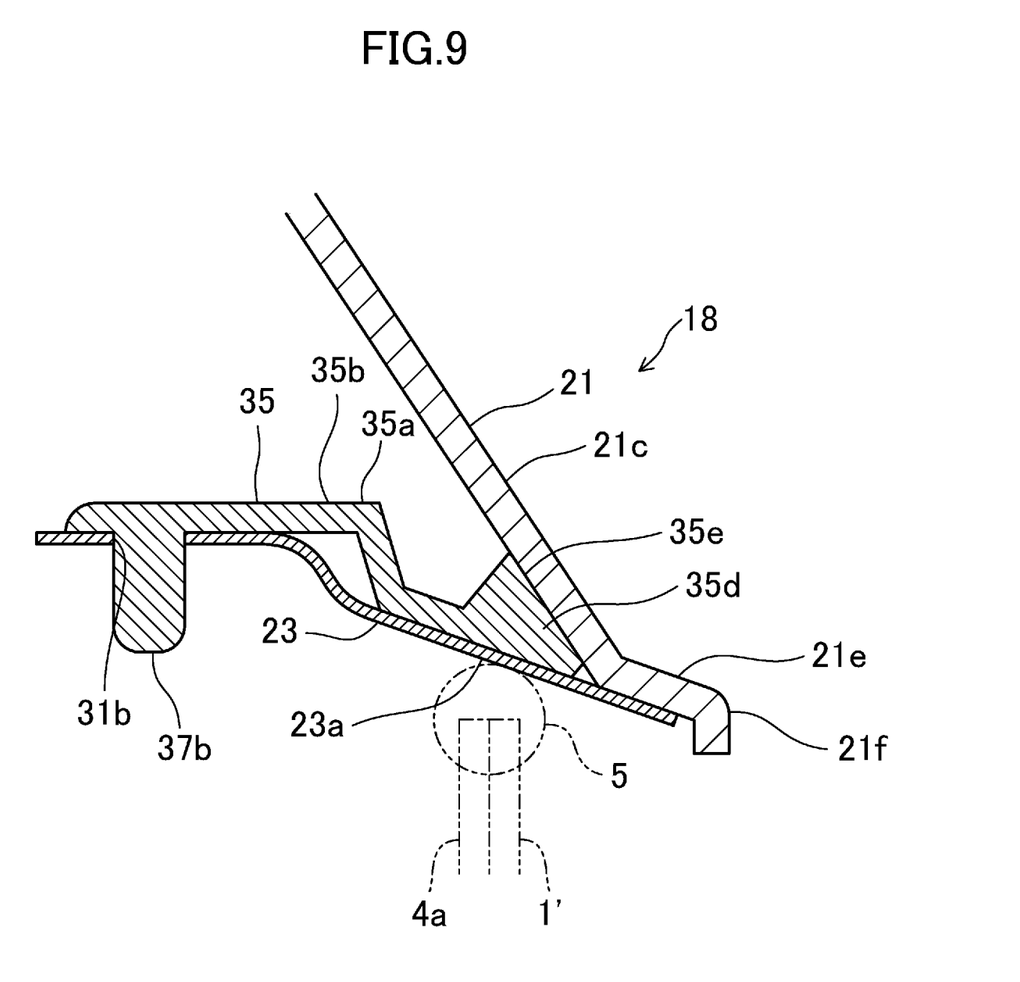
FIG. 9 is a cross-sectional view taken along line IX-IX of FIG. 6, with the deck cover being closed.
Figure 10:
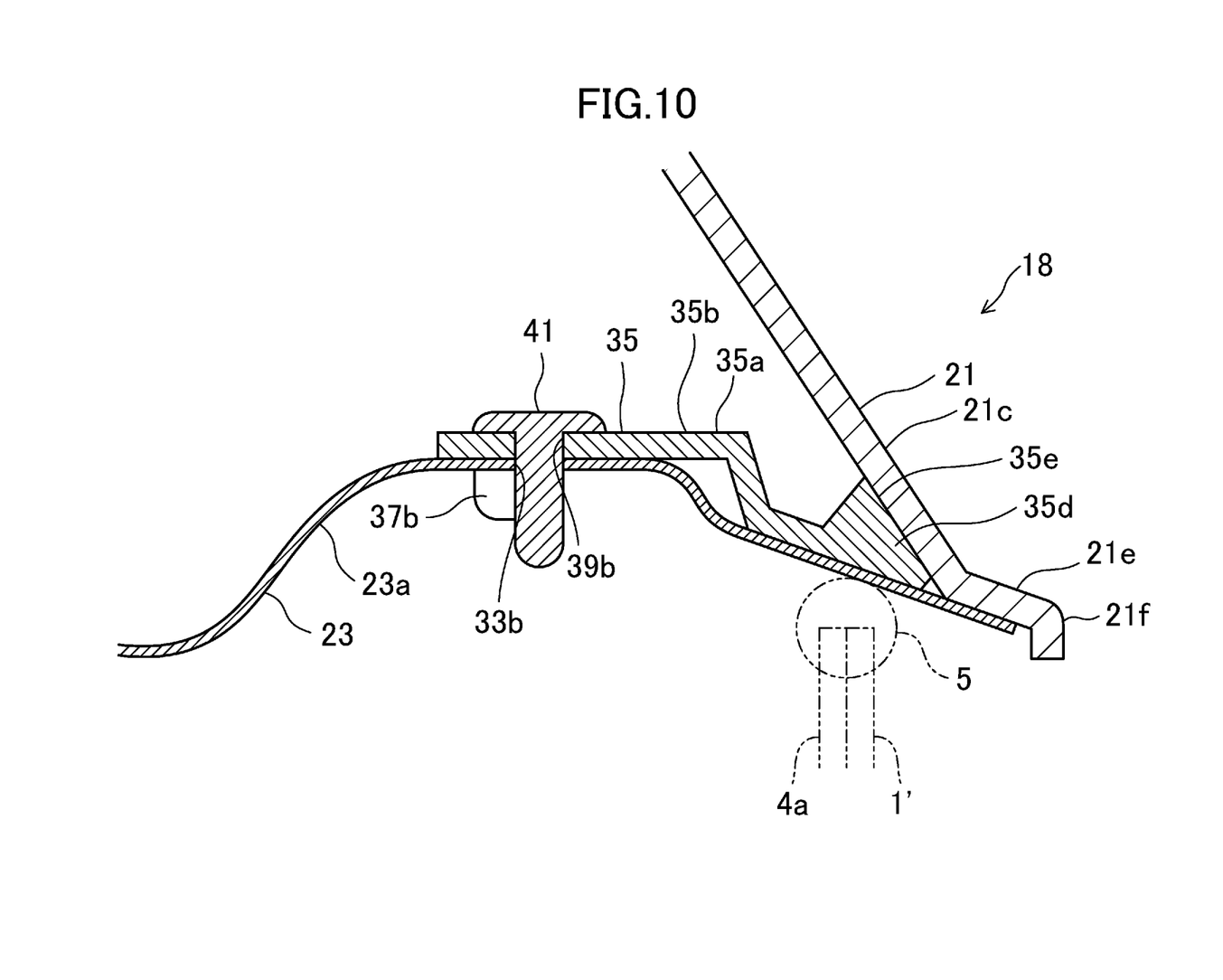
FIG. 10 is a cross-sectional view taken along line X-X of FIG. 6, with the deck cover being closed.
Figure 11:
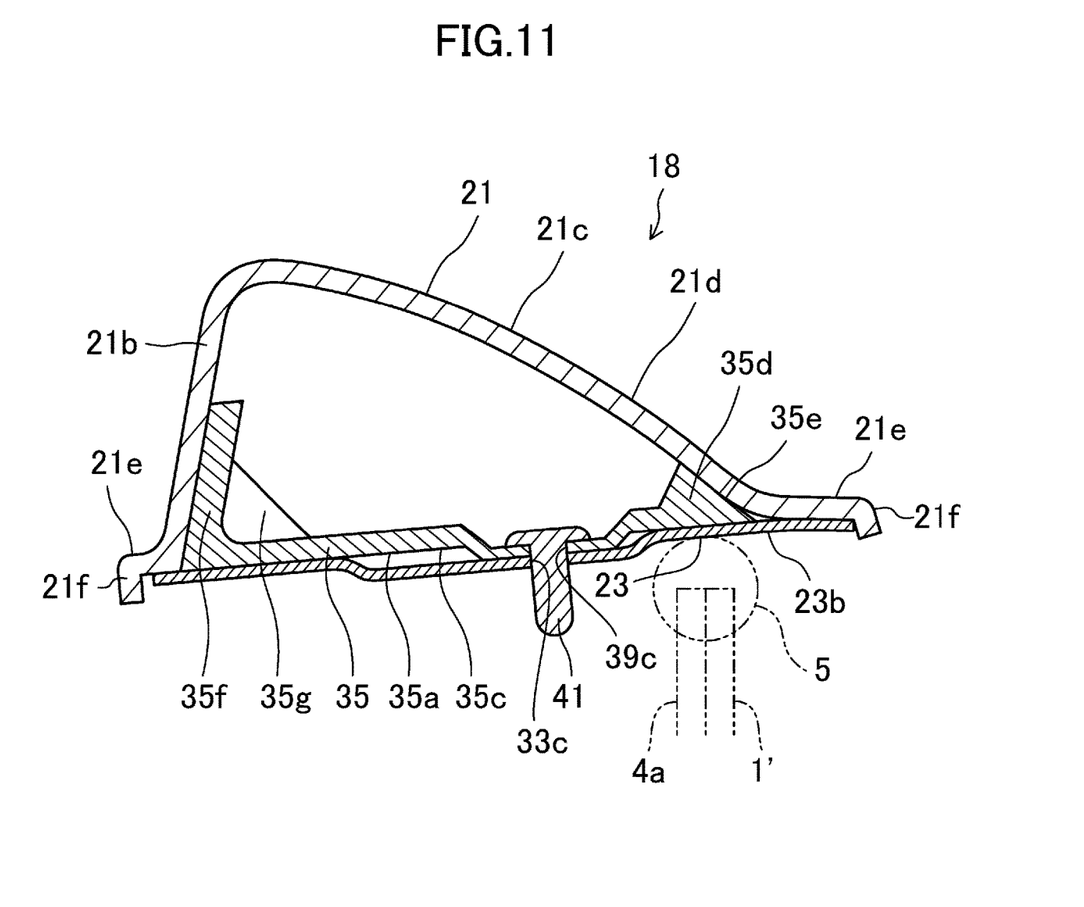
FIG. 11 is a cross-sectional view taken along line XI-XI of FIG. 6, with the deck cover being closed.

In a vehicle 1 of this embodiment shown in FIGS. 1 to 3, a cabin 2 which opens upward is formed substantially in the middle of a vehicle body 1' in a longitudinal direction of the vehicle body 1', and a storage 4 having an opening 4a which opens upward is formed in a rear portion of the vehicle body 1'. A weather strip 5 (see FIGS. 8 to 10) is attached to a peripheral edge of an opening 4a of the vehicle body 1'. The peripheral edge includes both edges in a vehicle width direction, and rear edge. The weather strip 5 is an annular member surrounding the cabin 2 and the opening 4a. The vehicle 1 is equipped with an opening/closing device 10 which covers and uncovers the cabin 2 and the storage 4. The opening/closing device 10 is switchable between a closed state in which a roof member 12 covers a top of a cabin 2 and an open state in which the top of the cabin 2 is uncovered. The opening/closing mechanism 10 includes a retractable roof 11, a deck cover 18 as a vehicle external panel, and a lock mechanism 20. First, it will be described below the configurations of these components basically in a state where the cabin 2 is closed (the state shown in FIG. 1).

<Retractable Roof>

The retractable roof 11 includes a roof member 12, and a back window 15 located behind the roof member 12. The roof member 12 extends in a longitudinal direction of the vehicle from an upper edge of a front header 3 of the vehicle 1 to an upper edge of the deck cover 18. The roof member 12 includes a front roof panel 13, and a middle roof panel 14 disposed behind the front roof panel 13. The back window 15 is a transparent member, and disposed above the storage 4 formed in the rear portion of the vehicle body 1'.

The retractable roof 11 is driven by a roof drive mechanism (not shown). Specifically, the roof drive mechanism includes a first drive motor, and a first link mechanism which links the first drive motor and the retractable roof 11 together. The first link mechanism transfers rotational power of the first drive motor to the front roof panel 13, the middle roof panel 14, and the back window 15. Thus, the retractable roof 11 is movable between a use position (shown in FIG. 1) and a retracted position (shown in FIG. 3). The retractable roof 11 in the use position is located outside the storage 4 to cover the cabin 2. The retractable roof 11 in the retracted position is retracted into the storage 4, thereby uncovering the cabin 2.

<Deck Cover>

As shown in FIG. 1, the deck cover 18 is attached to the vehicle body 1' behind the roof member 12 so as to cover and uncover the opening 4a of the storage 4. The deck cover 18 in a closed state covers the cabin 2 from behind. The deck cover 18 is provided with a mounting port 19 into which the back window 15 is mounted.

The deck cover 18 is driven by a deck drive mechanism (not shown). Specifically, the deck drive mechanism includes a second drive motor, and a second link mechanism which links the second drive motor and the deck cover 18 together. The second link mechanism transfers rotational power of the second drive motor to the deck cover 18. Thus, the deck cover 18 is movable between a home position (shown in FIGS. 1 and 3) and a retreated position (shown in FIG. 2, for example).

The deck cover 18 in the home position covers the opening 4a of the storage 4, and allows the back window 15 to fit in the mounting port 19. The deck cover 18 in the retreated position is located further rearward and obliquely upward than in the home position, and uncovers the opening 4a of the storage 4. Thus, the deck cover 18 in the retreated position allows the retractable roof 11 to move between the use position and the retracted position.

<Lock Mechanism>

The lock mechanism 20 is attached to a front end of a lower surface (surface toward the inside of the cabin) of the front roof panel 13. The lock mechanism 20 includes a hook member (not shown) which is able to engage with a striker (not shown) fixed to the front header 3 of the vehicle body 1' of the vehicle 1. When the retractable roof 11 is in the use position, the hook member engages with the striker to lock the roof member 12 and the front header 3 together.

<Detailed Configuration of Deck Cover>

As shown in FIGS. 4 to 6 and 9 to 11, the deck cover 18 includes an outer panel 21 located toward the outside of the vehicle 1, and an inner panel 23 joined onto a rear side of the outer panel 21. The outer panel 21 is made of resin such as a sheet molding compound (SMC), while the inner panel 23 is made of metal such as iron.

Figure 4:
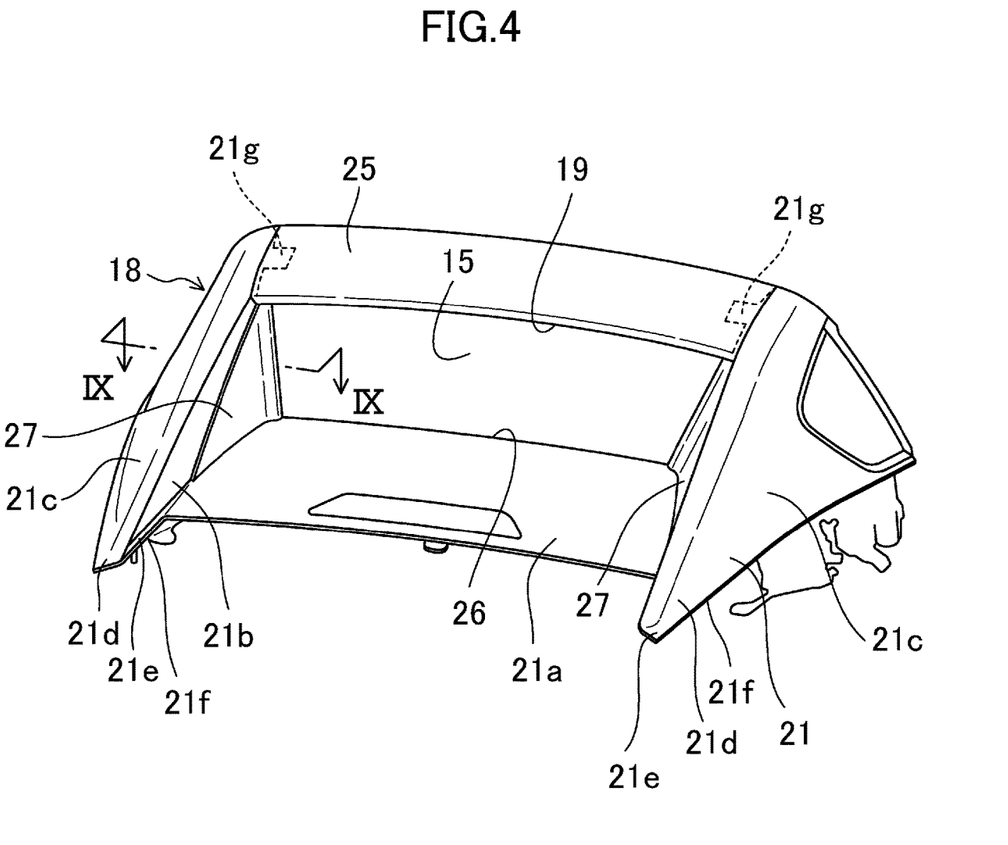
FIG. 4 is a perspective view of a deck cover as viewed obliquely from the right backward.
Figure 5:
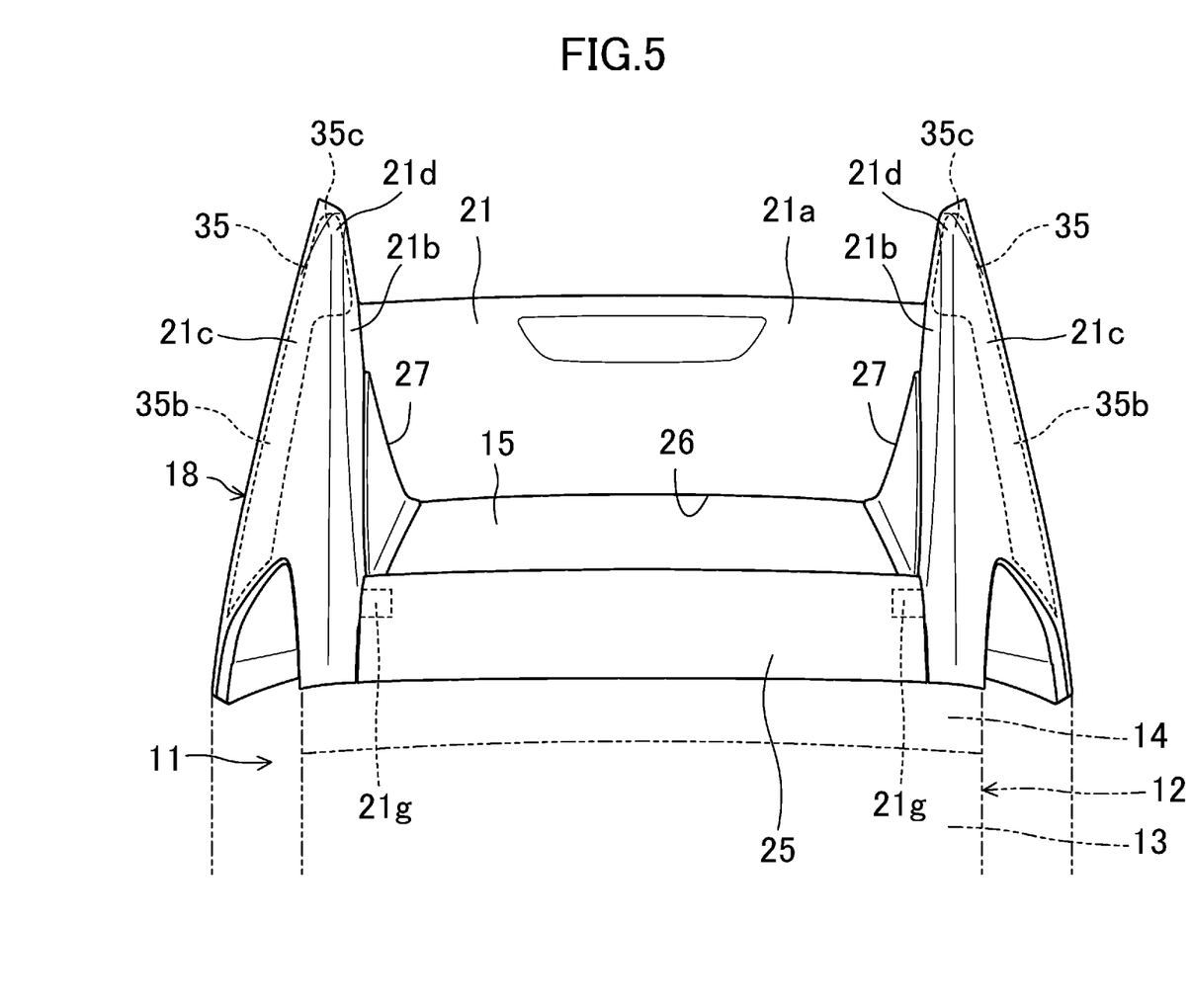
FIG. 5 is a plan view of the deck cover.
Figure 6:
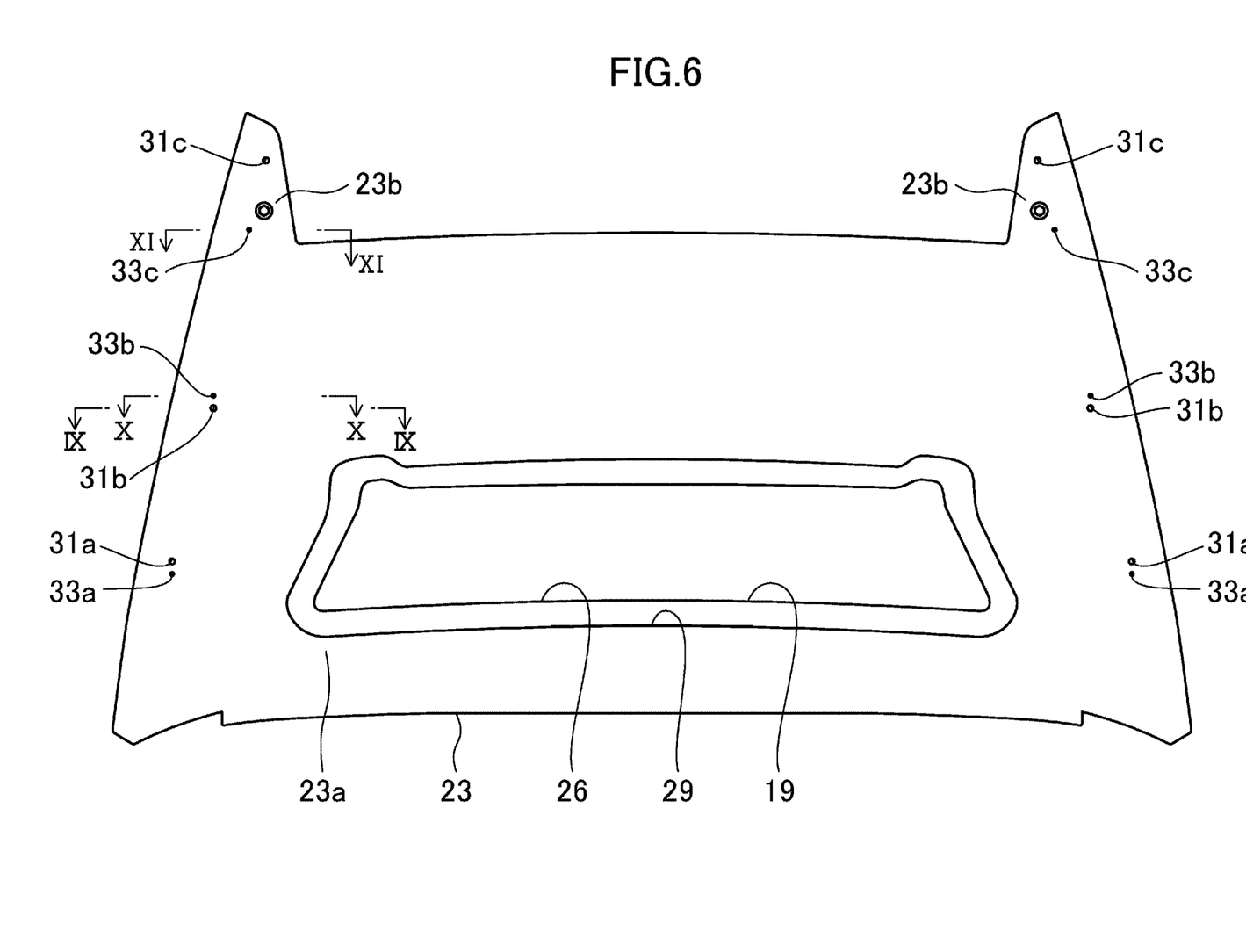
FIG. 6 is a bottom view of the deck cover.

The outer panel 21 includes a rectangular plate-like principal plane 21a, substantially triangular inner side planes 21b, and substantially triangular outer side planes 21c. The principal plane 21a extends in the vehicle width direction with its face oriented in the vertical direction. Each of the inner side planes 21b protrudes upward from an associated one of edges, in the vehicle width direction, of the principal plane 21a with a slight inclination toward the outside in the vehicle width direction. Each of the outer side planes 21c extends downward from a tip end of an associated one of the inner side planes 21b with an inclination toward the outside in the vehicle width direction so as to form a cross section substantially in the shape of an inverted V together with the associated inner side plane 21b. The inner and outer side planes 21b and 21c decrease in width as they go toward the rear of the vehicle body. The inner side planes 21b and the outer side planes 21c have rear ends protruding further rearward than the rear end of the principal plane 21a, thereby forming tapered protrusions 21d. The outer side planes 21c have front ends located further forward than those of the inner side planes 21d. Flanges 21e, each having its face oriented substantially in the vertical direction, protrude from an inner edge, in the vehicle width direction, of each of the inner side planes 21b, and an outer edge, in the vehicle width direction, of each of the outer side planes 21c. An outer peripheral protrusion 21f protrudes downward from the rear edge of the principal plane 21a and tip ends of the flanges 21e. A tab 21g protrudes inward in the vehicle width direction from a front end portion, in the vehicle width direction, of each of the inner side planes 21b. The tabs 21g and the inner side planes 21b are respectively integrated with each other. A rectangular plate-like decorative panel 25 is attached to the tabs 21g with its outer face oriented in a direction obliquely upward and rearward. The decorative panel 25 bridges front end portions of inner edges, in the vehicle width direction, of the outer side planes 21c. An opening 26 forming the mounting port 19 is formed between the decorative panel 25 and the outer panel 21. The front ends of the inner side planes 21b are respectively covered with substantially triangular rear pillars 27 from the inside in the vehicle width direction.

The inner panel 23 includes a substantially trapezoidal body 23a which increases in width as it goes toward the front of the vehicle, and tapered protrusions 23b extending from both ends of a narrower edge of the body 23a. The protrusions 23b have outer edges in the vehicle width direction which are continuous with the edges, in the vehicle width direction, of the body 23a. The body 23a is provided with an opening 29 corresponding to the opening 26 of the outer panel 21. At each edge (a portion adjacent to each edge) of the inner panel 23 in the vehicle width direction, three positioning holes 31a to 31c are formed as through holes arranged at intervals from the front to the rear, and three first rivet insertion holes 33a are formed as through holes arranged at intervals from the front to the rear. The two front positioning holes 31a and 31b and the two front first rivet insertion holes 33a and 33b are located in the body 23a, while the rearmost positioning hole 31c and the rearmost first rivet insertion hole 33c are located in the protrusions 23b. The two front first rivet insertion holes 33a and 33b are adjacent to the positioning holes 31a and 31b, respectively.

An outer peripheral portion of the inner panel 23 is entirely bonded to the outer panel 21 and the decorative panel 25 with an adhesive. The flanges 21e of the outer panel 21 are entirely bonded to the outer peripheral portion of the inner panel 23 with an adhesive. The protrusions 21d of the outer panel 21 are aligned with the protrusions 23b of the inner panel 23 in their thickness direction.

Figure 7:
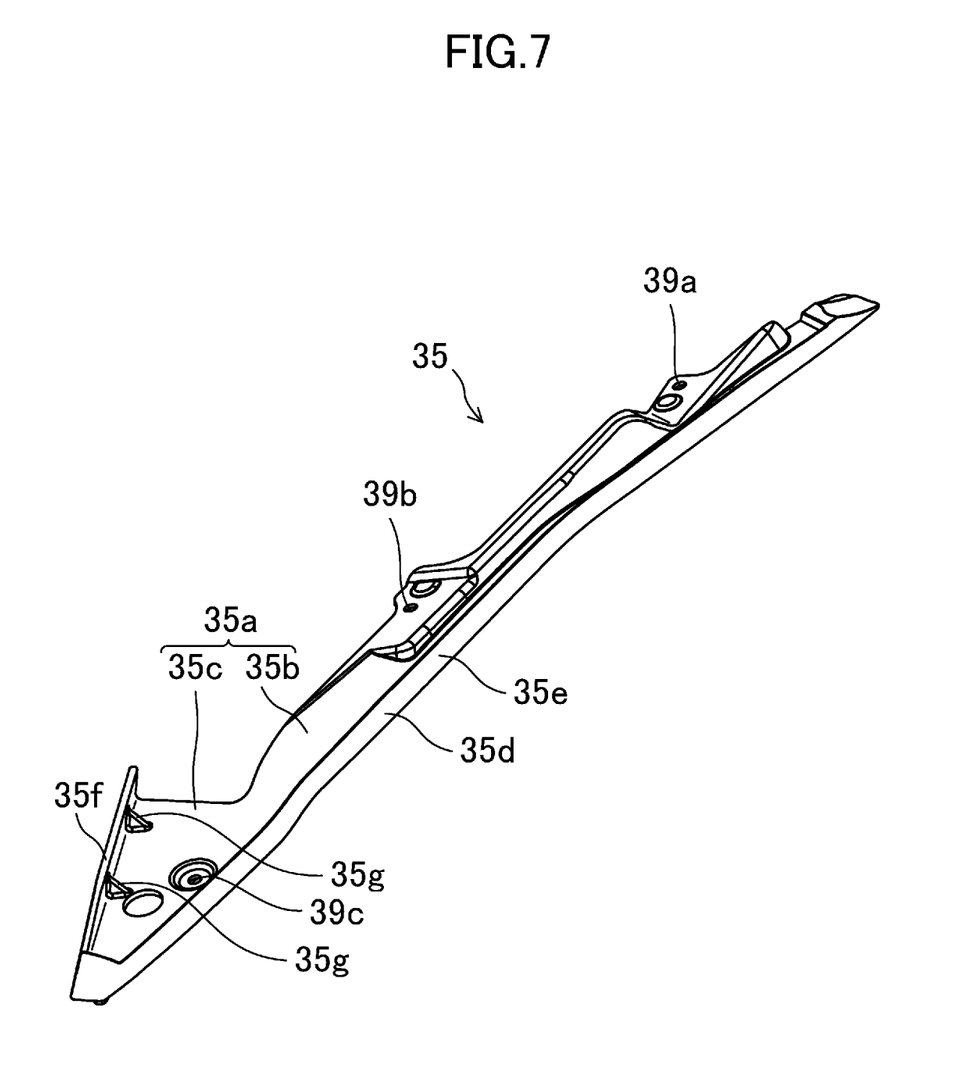
FIG. 7 is a perspective view of a spacer as viewed from the outer panel side.

Long spacers 35 (see FIGS. 7 and 8) made of resin such as a sheet molding compound (SMC) are respectively provided on portions of the inner panel 23 slightly inward of the edges in the vehicle width direction thereof so that each spacer 35 is interposed between the inner side plane 21b and the outer side plane 21c of the outer panel 21. The spacers 35 extend substantially in the longitudinal direction of the vehicle. Each of the spacers 35 has a long plate portion 35a. The plate portion 35a includes a main face 35b (serving as a body of the spacer) extending with a substantially constant width, and a rear end portion 35c linked to a rear end of the main face 35b and is in the shape of a substantially rectangle when viewed in plan to correspond to the shape of the protrusion 23b of the inner panel 23. The main face 35b is bonded with an adhesive to the portion of the body 23a of the inner panel 23 slightly inward of its edge in the vehicle width direction, and the rear end portion 35c is bonded with an adhesive to the protrusion 23b of the inner panel 23. A triangular protrusion 35d, which is triangular when viewed in section, protrudes toward the outer panel 21 from an outer end in the vehicle width direction, and front end, of the plate portion 35a, and extends along the whole length of the plate portion 35a. The triangular protrusion 35d has an inclined face 35e which is inclined toward a base end thereof (toward the inner panel 23) as it goes outside in the vehicle width direction. The inclined face 35e is bonded with an adhesive to a rear side of the outer side plane 21c of the outer panel 21. A plate-shaped wall 35f protrudes from an edge of the rear end portion 35c of the plate portion 35a, the edge corresponding to the inner edge, in the vehicle width direction, of the protrusion 23b of the inner panel 23, with an inclination toward the outside in the vehicle width direction as it goes toward the outer panel 21. A face of the wall 35f toward the inside in the vehicle width direction is bonded with an adhesive to a rear side of the inner side plane 21b of the outer panel 21. A pair of ribs 35g, each of which is in the shape of a triangular plate when viewed in plan, is disposed adjacent to an outer side, in the vehicle width direction, of the wall 35f on the rear end portion 35c. The ribs 35g protrude toward the outer panel 21 and arranged at intervals with their faces oriented in a direction along the inner edges, in the vehicle width direction, of the protrusions 23b of the inner panel 23, and are integrally coupled to the wall 35f. Column-shaped bosses 37a to 37c protrude from the plate portion 35a of the spacer 35 toward the inner panel 23 at positions corresponding to the positioning holes 31a to 31c of the inner panel 23. The bosses 37a to 37c, serving as positioning protrusions, are arranged in this order from the front to the rear. Further, second rivet insertion holes 39a to 39c are formed through the plate portion 35a of the spacer 35 at positions corresponding to the first rivet insertion holes 33a to 33c of the inner panel 23. The second rivet insertion holes 39a to 39c are arranged in this order from the front to the rear. Thus, the rearmost boss 37c and the rearmost second rivet insertion hole 39c are formed in the rear end portion 35c of the plate portion 35a. The bosses 37a to 37c respectively fit in the positioning holes 31a to 31c of the inner panel 23. Rivets 41 are inserted and swaged in the second rivet insertion holes 39a to 39c and the first rivet insertion holes 33a to 33c of the inner panel 23. FIGS. 6, and 9 to 11 show the state where the rivets 41 are not swaged.

To bond the outer and inner panels 21 and 23 configured as described above together with the spacers 35 interposed therebetween, first, an adhesive is applied to an entire outer peripheral portion of the inner panel 23 slightly inward of its outer peripheral edge. Then, the spacers 35 are placed on the inner panel 23 to be located slightly inward of the edges, in the vehicle width direction, of the inner panel 23 so that the bosses 37a to 37c of the spacers 35 correspond to the positioning holes 31a to 31c of the inner panel 23. In this state, the spacers 35 are pressed onto the inner panel 23 to spread the adhesive toward the outer peripheral edges of the inner panel 23, and the bosses 37a to 37c are allowed to fit in the positioning holes 31a to 31c. As a result, the adhesive is pushed toward the outer periphery of each spacer 35. Then, each of the rivets 41 is inserted and swaged in an associated one of pairs of the first rivet insertion holes 33a to 33c of the inner panel 23 and the second rivet insertion holes 39a to 39c of the spacers 35. Thus, the spacers 35 are positioned with respect to the inner panel 23 in the thickness direction. Further, an adhesive is applied to each of the spacers 35, in particular, the inclined face 35e and a side of the wall 35f facing the inside in the vehicle width direction. Thereafter, an outer peripheral portion of the outer panel 21 slightly inward of its outer peripheral edge and a front end portion of the decorative panel 25 are brought closer to the outer peripheral portion of the inner panel 23 to be in contact with the adhesive on the inner panel 23. At this time, the flanges 21e of the outer panel 21 come into contact with the adhesive that has come out of a gap between the spacers 35 and the inner panel 23. Further, each of the outer side planes 21c of the outer panel 21 makes contact with the adhesive on the inclined face 35e of the spacer 35, and each of the inner side planes 21b of the outer panel 21 makes contact with the adhesive on the inner side of the wall 35f of the spacer 35. In this state, the inner and outer panels 23 and 21 are left for a while at room temperature to cure the adhesive. Thus, the bonding of the panels is finished.

As can be seen, in the bonding process, the bosses 37a to 37c of the spacers 35 fit in the positioning holes 31a to 31c of the inner panel 23, and therefore, the spacers 35 can be positioned with respect to the inner panel 23 in a direction along the face of the inner panel 23. This facilitates the bonding process. Further, the adhesive is cured in a state where the rivets 41 are inserted and swaged in the first rivet insertion holes 33a to 33c of the inner panel 23 and the second rivet insertion holes 39a to 39c of the spacers 35 to position the spacers 35 with respect to the inner panel 23 in the thickness direction. This can reduce the possibility of bonding failure caused by lifting of the spacers 35 or lack of an adhesive between the spacers 35 and the inner panel 23.

—Operation of Opening/Closing Mechanism—

It will be described below how the opening/closing mechanism 10 performs an opening operation and a closing operation with reference to FIGS. 1 to 3. The "opening operation" is performed to bring the retractable roof 11 in the use position to the retracted position. The "closing operation" is performed to bring the retractable roof 11 in the retracted position to the use position.

In the opening operation, the lock mechanism 20 unlocks the front header 3. Further, the deck cover 18 in the home position moves toward the retreated position. Then, the retractable roof 11 in the use position moves toward the retracted position.

Specifically, the front roof panel 13, the middle roof panel 14, and the back window 15 independently pivot via a plurality of link members (not shown) so that they move together toward the storage 4 (see, e.g., FIG. 2). When the front roof panel 13, the middle roof panel 14, and the back window 15 are all stored in the storage 4 in a folded state, the deck cover 18 in the retreated position returns to the home position (see FIG. 3). Thus, the cabin 2 is opened.

To close the cabin 2 in the opened state, first, the deck cover 18 in the home position moves toward the retreated position. Next, the retractable roof 11 in the storage position moves toward the use position.

Specifically, the front roof panel 13, the middle roof panel 14, and the back window 15 independently pivot via the plurality of link members so that they move together toward the cabin 2 (see, e.g., FIG. 2). Thereafter, the retractable roof 11 reaches the use position, and the deck cover 18 in the retreated position returns to the home position (see FIG. 1). Thus, the cabin 2 is closed. The lock mechanism 20 then locks the front header 3. In this state, both ends of the closed deck cover 18 in the vehicle width direction and a portion of the deck cover 18 slightly inward of a rear edge thereof are continuously in contact with the weather strip 5 from above. Thus, a portion of the deck cover 18 provided with the spacers 35 makes contact with the weather strip 5.

Hence, according to this embodiment, the spacers 35 are interposed between the outer panel 21 and the inner panel 23 at the contact between the deck cover 18 and the weather strip 5. Therefore, the outer panel 21 can be inclined steeply with respect to the inner panel 23 at the contact between the deck cover 18 and the weather strip 5. This improves design flexibility.

Moreover, as compared to a structure in which a portion of the inner panel 23 inward of its outer peripheral portion is joined to the outer panel 21, the structure of this embodiment in which the outer peripheral portion of the inner panel 23 is joined to the outer panel 21 is more resistant to water entering between the panels 21 and 23. This can reduce the possibility of water leakage in the cabin 2 and rust.

Further, the spacers 35 reinforce the contact between the deck cover 18 and the weather strip 5. This can provide the deck cover 18 with improved rigidity.

In addition, the spacers 35 are interposed between the protrusions 21d of the outer panel 21 and the protrusions 23b of the inner panel 23 to reinforce the portions of the deck cover 18 corresponding to the protrusions 21d and 23d. This can reduce the possibility of peeling of the portions of the deck cover 18 corresponding to the protrusions 21d and 23d from the vehicle body.

Furthermore, the deck cover 18 makes contact with the weather strip 5 at a portion near its outer peripheral edge. Thus, as compared to the case where the deck cover 18 makes contact with the weather strip 5 at a further inward portion, the opening 4a of the storage 4 can have a larger opening area.

In this embodiment, the structure of the present invention has been applied to the deck cover 18 of a convertible. Alternatively, the present invention can be applied to other vehicle external panel, such as a trunk lid, a door, or a hood.

INDUSTRIAL APPLICABILITY

The present invention is useful as a structure for attaching a vehicle external panel to a vehicle body in such a manner that the vehicle external panel can cover and uncover an opening of the vehicle body.

DESCRIPTION OF REFERENCE CHARACTERS

1 Vehicle
1' Vehicle Body
4a Opening
5 Weather Strip
18 Deck Cover
21 Outer Panel
23 Inner Panel
31a-31c Positioning Hole
33a-33c First Rivet Insertion Hole
35 Spacer
37a-37c Boss (Positioning Protrusion)
39a-39c Second Rivet Insertion Hole
41 Rivet

The invention claimed is:

1. A structure for attaching, to a vehicle body of a vehicle, an external panel which is able to cover and uncover an opening of the vehicle body, wherein:
  a weather strip is attached to a peripheral edge of the opening of the vehicle body,
  the external panel includes an outer panel made of resin, and an inner panel joined onto a rear side of the outer panel,
  a spacer is interposed between the outer panel and the inner panel, and
  a portion of the external panel provided with the spacer makes contact with the weather strip when the external panel is closed.

2. The structure of claim 1, wherein:
  a positioning hole is formed through the inner panel,
  the spacer is bonded to the inner panel with an adhesive, and
  the spacer has a positioning protrusion fitting in the positioning hole of the inner panel.

3. The structure of claim 1 or 2, wherein:
  a first rivet insertion hole is formed through the inner panel,
  the spacer is bonded to the inner panel with an adhesive, and
  a second rivet insertion hole is formed through the spacer, and a rivet is inserted and swaged in the second rivet insertion hole and the first rivet insertion hole of the inner panel.

* * * * *